United States Patent [19]
Schultz et al.

[11] Patent Number: 5,601,332
[45] Date of Patent: Feb. 11, 1997

[54] REPLACEABLE SEAT BOOSTER WITH AN INFLATABLE AIR CUSHION MODULE

[75] Inventors: Elaine S. Schultz, Troy; S. Ato Awotwi, Lathrup Village, both of Mich.

[73] Assignee: Hoover Universal, Inc., Plymouth, Mich.

[21] Appl. No.: 380,092

[22] Filed: Jan. 30, 1995

[51] Int. Cl.⁶ .................................................. B60R 21/00
[52] U.S. Cl. .............................. 297/216.13; 280/730.2; 280/728.3
[58] Field of Search ...................... 297/216.13, 216.11, 297/219.1, 223, 487; 280/730.2, 730.1, 728.2, 728.3, 728.1

[56] References Cited

U.S. PATENT DOCUMENTS

| | | |
|---|---|---|
| 4,946,191 | 8/1990 | Putsch . |
| 5,112,079 | 5/1992 | Haland et al. . |
| 5,180,187 | 1/1993 | Muller et al. ................. 280/728.3 X |
| 5,251,931 | 10/1993 | Semchena et al. . |
| 5,348,342 | 9/1994 | Haland et al. . |
| 5,487,588 | 1/1996 | Ball et al. ........................ 280/728.3 |

FOREIGN PATENT DOCUMENTS

| | | | |
|---|---|---|---|
| 2696392 | 4/1994 | France ........................... 280/728 B |
| 4050052 | 2/1992 | Japan ............................. 280/730 A |
| 4135945 | 5/1992 | Japan ............................. 280/730 A |

*Primary Examiner*—Laurie K. Cranmer
*Attorney, Agent, or Firm*—Harness, Dickey & Pierce, P.L.C.

[57] ABSTRACT

A replaceable side bolster module for a vehicle seat in which the bolster module includes an inflatable air cushion and a gas generator for inflating the air cushion. By providing an inflatable air cushion within a replaceable side bolster, following deployment of the air cushion, only the bolster needs to be replaced as opposed to replacing the entire vehicle seat. The foam pad of the replaceable side bolster module has a slit cut therein immediately adjacent to the inflatable air cushion providing a localized weakening of the foam pad. The air cushion deploys through this slit, thus the location of the slit serves to provide directional guidance to the deploying air cushion.

5 Claims, 3 Drawing Sheets

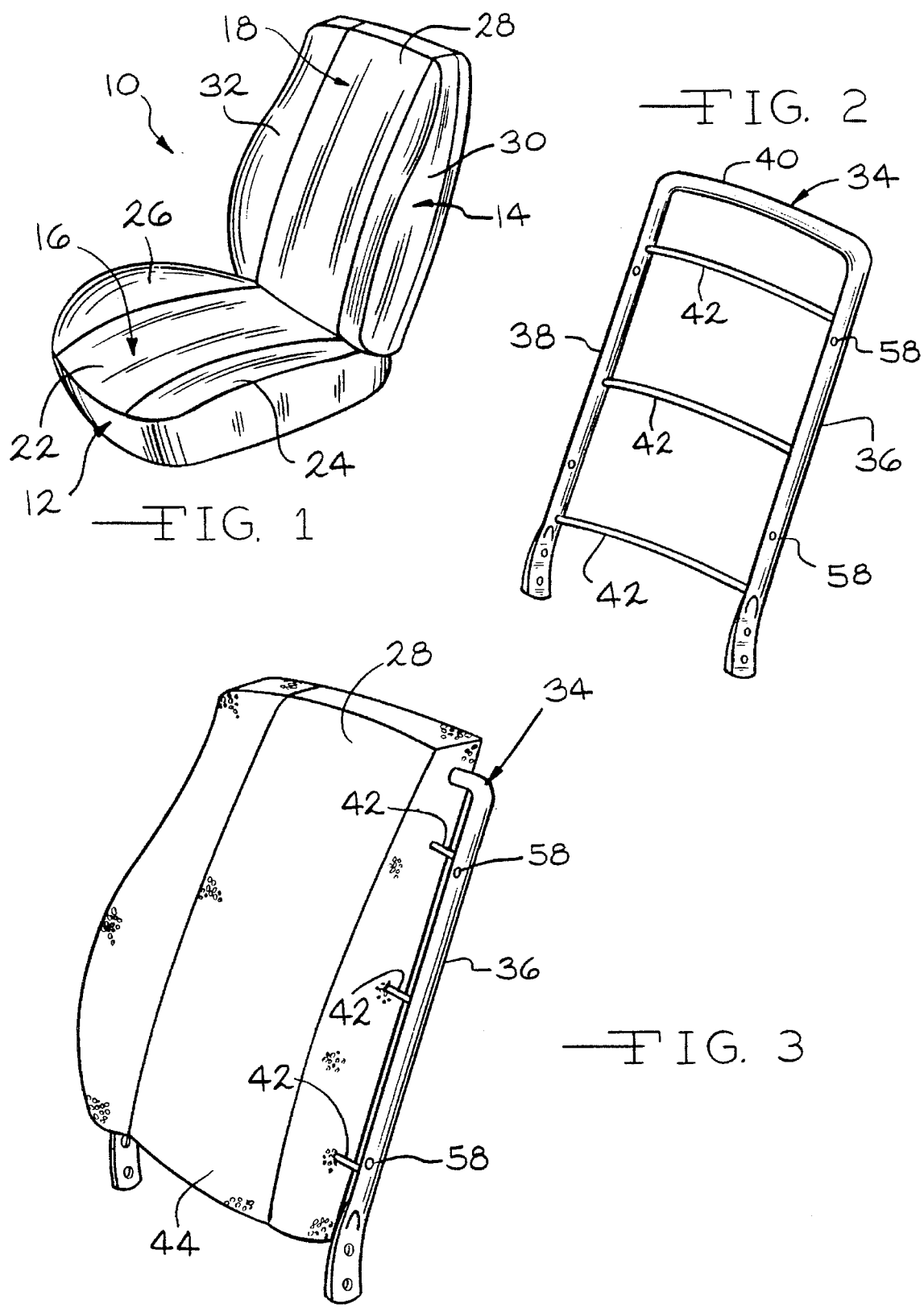

REPLACEABLE SEAT BOOSTER WITH AN INFLATABLE AIR CUSHION MODULE

BACKGROUND AND SUMMARY OF THE INVENTION

The present invention relates generally to a vehicle seat having an inflatable side impact air cushion and in particular to a seat with a replaceable side bolster containing an air cushion module therein.

In recent years automobile manufactures have directed increasing attention to providing improved side impact protection for vehicle occupants. One method of doing so is to provide an inflatable side impact air cushion mounted to a vehicle seat along the side edge of the seat. The air cushion deploys between the seat occupant and the side of the vehicle to provide improved occupant protection. One disadvantage with seat mounted inflatable air cushions is that with most seat designs, following deployment of the air cushion, replacement of the entire seat is required. Replacement of the entire seat is wasteful when the vehicle collision itself does not damage the seat except for the air cushion deployment. Accordingly, it is an object of the present invention to provide a seat in which a deployed seat mounted air cushion can be replaced without replacement of the entire seat.

The present invention provides a replaceable side bolster in either the seat back and/or the seat cushion. The air cushion module, having a folded, stored air cushion and gas generator for inflating the air cushion, is contained in the bolster. Following deployment of the air cushion, only the bolster is replaced. As a result, expensive replacement of the entire seat is no longer required.

The replaceable side bolster module includes a frame to which an air cushion module is mounted. A bolster foam pad is placed around the bolster frame and air cushion module, and is then covered with a trim cover. The seat component to which the bolster is attached, includes a seat frame with a main foam pad attached thereto having its own trim cover. A portion of the seat frame is accessible along one side edge for attachment of the side bolster module thereto.

An extending flap from the main trim cover is wrapped over the exposed seat frame following attachment of the bolster to provide a finished appearance. The flap and the bolster trim cover include a releasable fastener, such as a hook and loop fastener, "J" strip retainer, etc. to attach the main trim cover flap to the bolster trim cover.

The bolster foam pad includes a slit extending from the inflatable air cushion toward the bolster trim cover. The slit forms a "weak" portion in the bolster foam to provide directional guidance to the air cushion as the air cushion is initially deployed. The slit in the foam does not extend entirely through the foam to the bolster trim cover. The deploying air cushion will cause the remaining, intact, portion of the bolster foam pad to tear open, and will also cause the bolster trim cover to tear open, allowing complete deployment of the air cushion.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat having the replaceable side bolster of the present invention;

FIG. 2 is a perspective view of the seat frame for the seat back of the seat shown in FIG. 1;

FIG. 3 is a perspective view illustrating the seat frame with the main foam pad including one side bolster installed on the frame;

DETAILED DESCRIPTION OF THE PREFERRED EMBODIMENT

Figure 4:
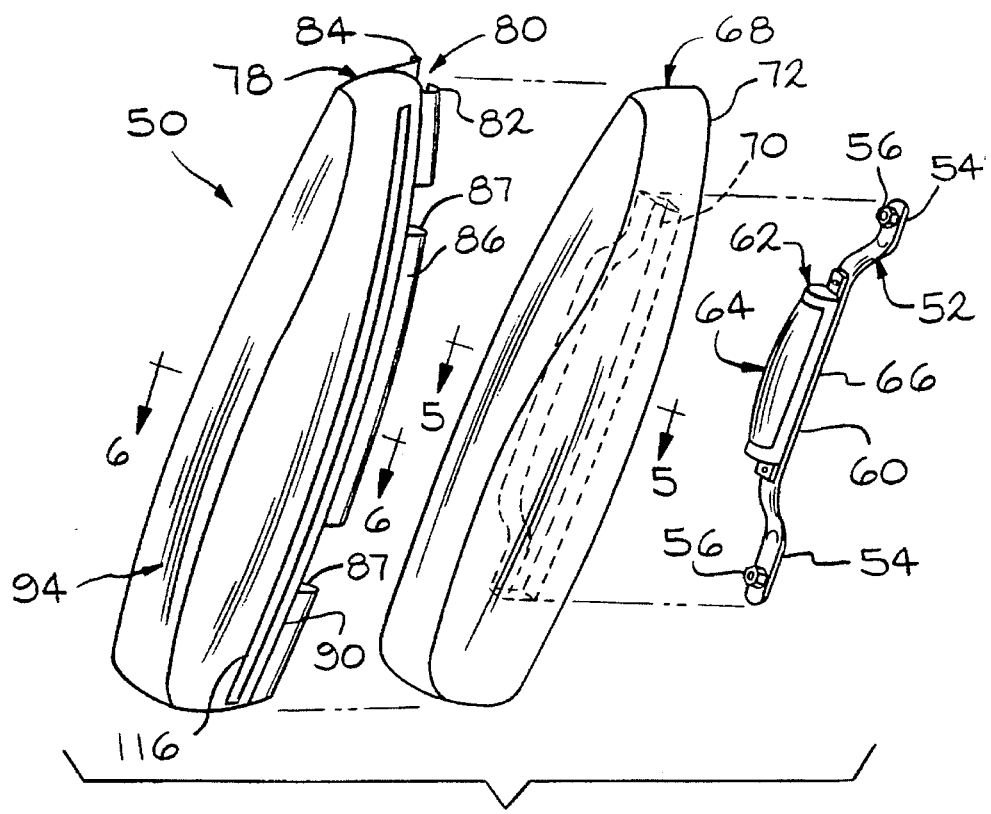
FIG. 4 is an exploded perspective view of a replaceable side bolster module according to the, present invention.
Figure 5:
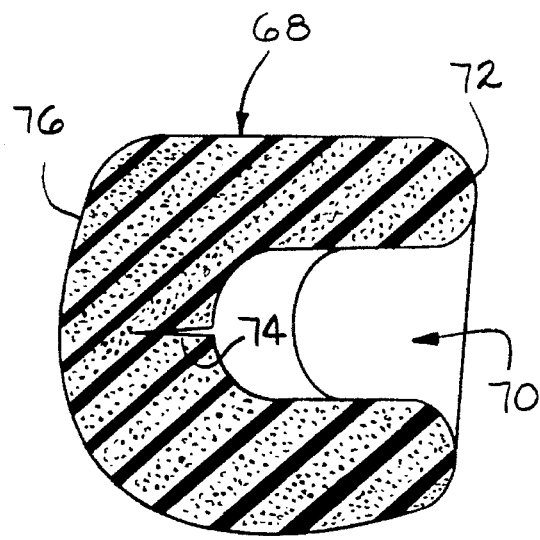
FIG. 5 is a sectional view of the side bolster foam pad as seen from substantially the line 5—5 of FIG. 4.
Figure 6:
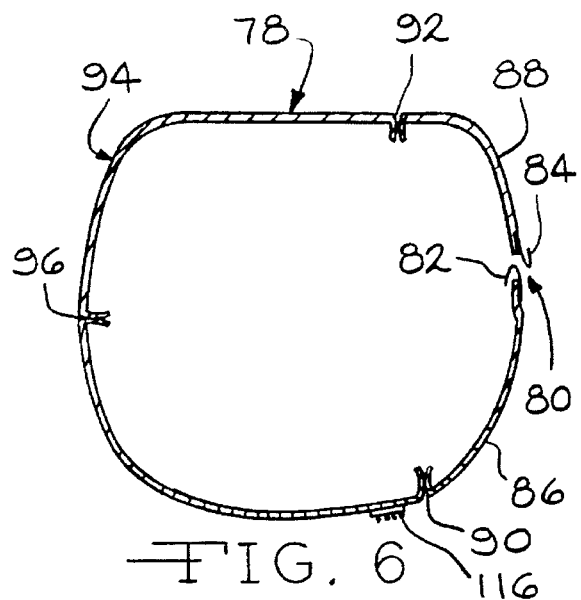
FIG. 6 is a sectional view of the side bolster trim cover as seen from substantially the line 6—6 of FIG. 4.

A vehicle seat having the replaceable side bolster according to the present invention is shown in FIG. 1 and is designated generally at 10. The seat 10 has a pair of seat components 12, 14. The seat component 12 forms a lower seat cushion 16 while the seat component 14 forms a seat back 18.

The seat component 12 includes a center portion 22 and a pair of side bolsters 24, 26, respectively. Likewise, the seat component 14 includes a center portion 28 and a pair of side bolsters 30, 32. The replaceable side bolster of the present invention is described below in connection with the side bolster 30 of the seat component 14. It is to be understood that any of the four side bolsters of the seat 10 can be made as a replaceable side bolster according to the present invention. The present invention of a replaceable side bolster containing an air cushion is not limited to a bucket seat such as the seat 10 shown in FIG. 1, but can be used with a wider bench seat having a side bolster. Furthermore, the invention is not limited to a vehicle front seat but can be used in a center and/or rear seat.

With reference to FIG. 2, a U-shaped tubular frame 34 is shown which serves as a seat frame for the seat component 14. The seat frame 34 has a pair of upright members 36, 38 along opposite sides of the seat and an upper cross member 40 extending transversely at the upper ends of the upright members. Support wires 42 extend laterally between the upright members 36, 38 to provide support for the center portion 28 of the seat component 14. This particular seat frame structure is not required for the invention but is only shown as an example.

With reference to FIG. 3, a foam pad 44 which forms the center portion 28 and side bolster 32 of the seat component 14 is shown installed upon the frame 34. The foam pad 44 leaves a portion of the frame 34, the upright member 36 and the end portions of the wires 42 exposed.

With reference to FIG. 4, a side bolster module 50 is shown which forms the side bolster 30 of the seat component 14. The module 50 includes a bolster frame 52. The frame 52 is shown being made as a bent tube having flattened ends 54, but could also be made by stamping sheet metal, etc. Weld nuts 56 are welded to the flattened ends 54 of the bolster frame. The weld nuts 56 are used to attach the bolster frame to the upright member 36 of the seat frame 34 with bolts 57 extending through the apertures 58 in the seat frame and threaded into the weld nuts. The bolster frame 52 has a center portion 60 which is raised from the upright member 36 of the seat frame to provide support for the side bolster foam pad 68.

A side impact air cushion module 62 is attached to the bolster frame center portion 60. The air cushion module 62 includes a folded, inflatable air cushion 64 and a gas generator 66 for generating an inflation gas for the air cushion.

The bolster foam pad 68 is placed over the bolster frame 52 and air cushion module 62. The foam pad 68 has a hollow cavity 70 along its rear side 72 for reception of the bolster frame and air cushion module into foam pad 68. The foam pad 68 also has a slit 74 which extends forward from the hollow cavity 70, toward the front surface 76 of the bolster foam pad. The slit 74 lies directly in front of the air cushion 64. The slit 74 results in a localized weakening of the foam pad. The air cushion deploys through this slit, thus, the direction of air cushion deployment is guided by the location of the slit in the foam pad. The slit does not extend entirely to the bolster from the cover to avoid a weak spot in the bolster that is noticeable by a seat occupant. As the air cushion 64 deploys through the slit 74, the foam pad forward of the slit 74 will tear, completing the passage for the air cushion through the bolster foam pad.

The bolster module also includes a bolster trim cover 78 surrounding the bolster foam pad 68. The trim cover 78 is made from a plurality of separate pieces of sheet material sewn together forming an envelope for covering the bolster foam pad and frame. The bolster trim cover has a rear opening 80 to enable the cover to be placed over the foam pad 68. The opening 80 is closed by a pair of J-hook fastener strips 82, 84 along the edges of the opening 80. Other fasteners such as a hook and loop fastener, snaps, zippers, etc. can be used to close the opening 80.

The opening 80 is in the back of the trim cover and will ultimately be concealed as described below. Since the back of the cover will be covered, the edge portions 86, 88 of the trim cover, adjacent the opening 80, are made with a less expensive material than is the front portion of the trim cover which is made with upholstery material. The edge portion 86 includes a pair of openings 87 which are aligned with the weld nuts on the bolster frame 52 for passage of bolts 57 to attach the bolster module to the seat frame. Seams 90, 92 attach the edge portions to the front panel 94 of the trim cover.

The front panel 94 may be made with a single piece of upholstery material or it can be made with two pieces of upholstery material joined together with a seam 96. The seam 96 may or may not be required for deployment of the air cushion 64. Depending upon the characteristics of the upholstery material, the material may tear during deployment of the air cushion to allow the air cushion to project from the bolster. If not, a seam in the trim cover may be necessary which is designed to tear open for deployment of the air cushion.

Figure 7:
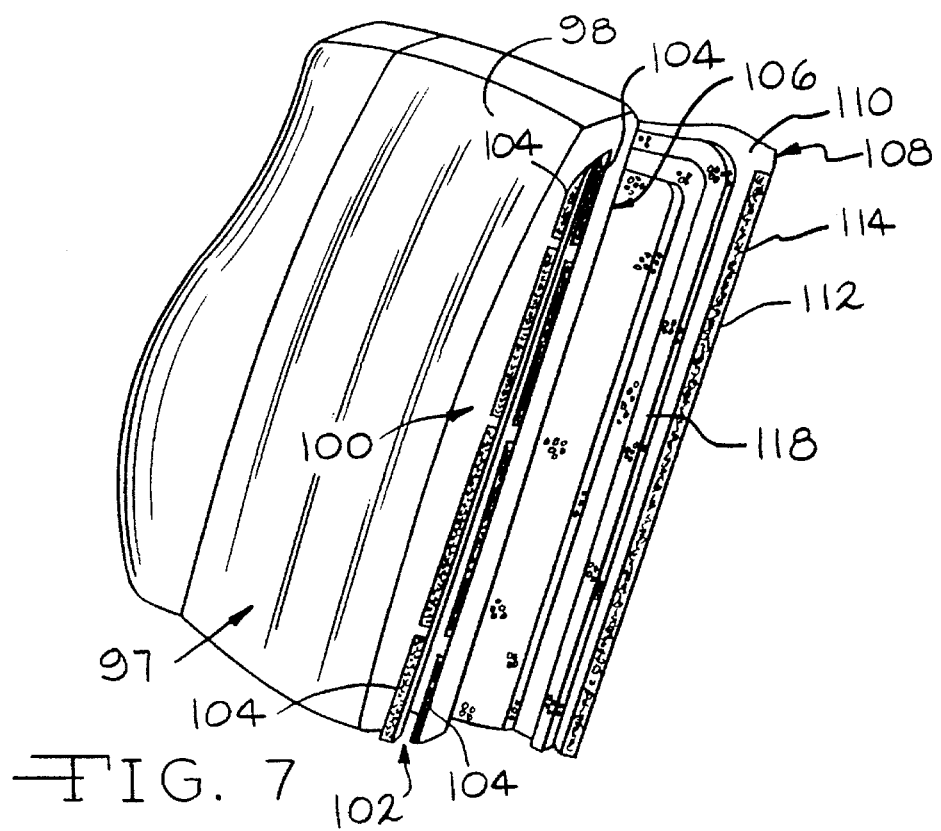
FIG. 7 is a fragmentary perspective view of the trim cover for the seat cushion main foam pad.
Figure 8:
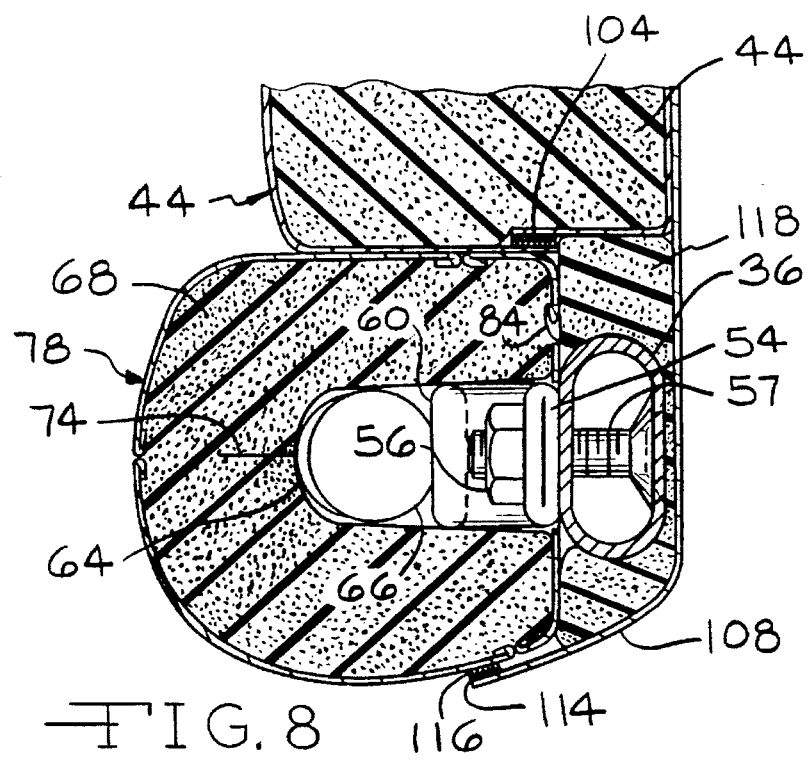
FIG. 8 is a fragmentary sectional view of the assembled seat back support as seen from substantially the line 8—8 of FIG. 1.

With reference to FIG. 7, a trim cover 97 is shown for covering the foam pad 44. The trim cover 97 includes a front panel 98 forming the front surface of the seat component 14. The side panel 100 of the trim cover has a slotted opening 102 which extends from the lower end toward the top end of the trim cover to enable the trim cover to be passed over the exposed portion of the seat frame 34 and the support wires 42. Along the length of the side panel opening 102 are a number of pairs of fasteners 104 which are used to close the opening 102 between the wires 42 and frame 34. The fasteners 104 are shown as matching strips of a hook and loop fastener. Other fasteners may be used such as snaps, J-strips, etc.

A flap 108 extends from the seam 106 which joins the side panel 100 to the rear panel of the trim cover 97. The flap 108 is made of the an upholstery material. The non-finished side 110 of the flap material is viewed in FIG. 7. Along the distal edge 112 of the flap, a fastening strip 114 is provided, such as one strip of a hook and loop fastener. A mating strip 116 of the hook and loop fastener is provided on the side of the bolster trim cover 78. After attachment of the bolster module to the frame 34, the flap 108 is wrapped behind the bolster module, covering the back of the bolster trim cover and providing a finished appearance to the seat 10. The fastener strips 114, 116 are connected together to hold the flap 108 in place. Various types of fasteners can be used to hold the flap in place such as the previously mentioned hook and loop fastener, snaps, zippers, etc. Since the flap 108 is all that covers the frame upright member 36, a foam pad 118 may be attached to the inner, non-finished surface of the flap 108. The pad 118 will cover the rear of the frame upright member 36.

Following deployment of the air cushion 64, the bolster 30 is removed from the seat for replacement by first opening the flap 108 and then removing the bolster module from the frame 34. A new bolster module is then attached to the frame 34 and the flap 108 is closed around the back of the new bolster module. As a result, deployment of the air cushion without other damage to the seat 10 only requires replacement of the bolster module instead of replacement of the entire seat.

To assist in venting of the deployed air bag and to provide a path for back pressure release gases, the flap 108 of the trim cover 97 and the edge portions 86, 88 of the bolster trim cover 78, are formed of a porous, gas permeable material such as a woven fabric. The porous nature of these materials enables the air cushion and back pressure gases to be released from the seat rather than entrapping the gases within the trim covers by the use of a non-porous material such as sheet vinyl.

It is to be understood that the invention is not limited to the exact construction illustrated and described above, but that various changes and modifications may be made without departing from the spirit and scope of the invention as defined in the following claims.

We claim:

1. A seat component for a vehicle seat comprising:

a seat frame;

a first foam pad mounted on said frame and having opposite side edges;

a side bolster module for attachment to said seat frame along one of said side edges of said first foam pad, said side bolster module including a bolster frame, an inflatable air cushion and a gas generator for inflating said air cushion mounted to said bolster frame, a bolster foam pad covering said air cushion and said gas generator, a side bolster trim cover substantially surrounding said bolster foam pad and means for releasably attaching said bolster frame to said seat frame along said one side edge whereby said bolster module forms a replaceable side bolster for said seat component along said one side edge of said first foam pad; and a main trim cover substantially covering said first foam pad, said main trim cover including an extending flap portion covering said seat frame opposite from said side bolster module, said flap portion and said bolster trim cover including cooperating means for releasably attaching said flap portion to said bolster trim cover.

2. The seat component of claim 1 wherein said means for releasably attaching said flap portion to said bolster trim cover includes complementary hook and loop fastener strips.

3. A seat component for a vehicle seat comprising:

a seat frame;

a first foam pad mounted on said frame and having opposite side edges, a portion of said seat frame extending from said foam pad along one of said side edges;

a main trim cover substantially covering said first foam pad; and a side bolster module for attachment to said seat frame along one of said side edges of said first foam pad, said side bolster module including a bolster frame, an inflatable air cushion and a gas generator for inflating said air cushion mounted to said bolster frame, a bolster foam pad covering said air cushion and said gas generator, and means for releasably attaching said bolster frame to said extending portion of said seat frame along said one side edge whereby said bolster module forms a replaceable side bolster for said seat component along said one side edge of said first foam pad;.

said side bolster module further comprising a bolster trim cover substantially surrounding said bolster foam pad, said bolster trim cover having an opening to enable said bolster trim cover to be placed over said bolster foam pad and frame and said bolster trim cover further comprising closure means for closing said opening after said bolster trim cover has been placed over said bolster foam pad.

4. A seat component for a vehicle seat comprising:

a seat frame;

a first foam pad mounted on said frame and having opposite side edges, a portion of said seat frame extending from said foam pad along one of said side edges;

a main trim cover substantially covering said first foam pad; and a side bolster module for attachment to said seat frame along one of said side edges of said first foam pad, said side bolster module including a bolster frame, an inflatable air cushion and a gas generator for inflating said air cushion mounted to said bolster frame, a bolster foam pad covering said air cushion and said gas generator, and means for releasably attaching said bolster frame to said extending portion of said seat frame along said one side edge whereby said bolster module forms a replaceable side bolster for said seat component along said one side edge of said first foam pad said bolster module partially covering said extending portion of said seat frame whereby said main foam pad and said bolster module leave a part of said extending portion of said seat frame exposed and said main trim cover includes an extending flap portion for covering said exposed part of said seat frame.

5. The seat component of claim 4 further comprising a bolster trim cover substantially surrounding said bolster foam pad, said bolster trim cover having an opening to enable said bolster trim cover to be placed over said bolster foam pad and frame and said bolster trim cover further comprising closure means for closing said opening after said bolster trim cover has been placed over said bolster foam pad, said flap portion of said main trim cover covering said means for closing said opening in said bolster trim cover and said flap portion and said bolster trim cover including cooperating means for releasably attaching said flap portion to said bolster trim cover.

* * * * *